Patented Nov. 14, 1950

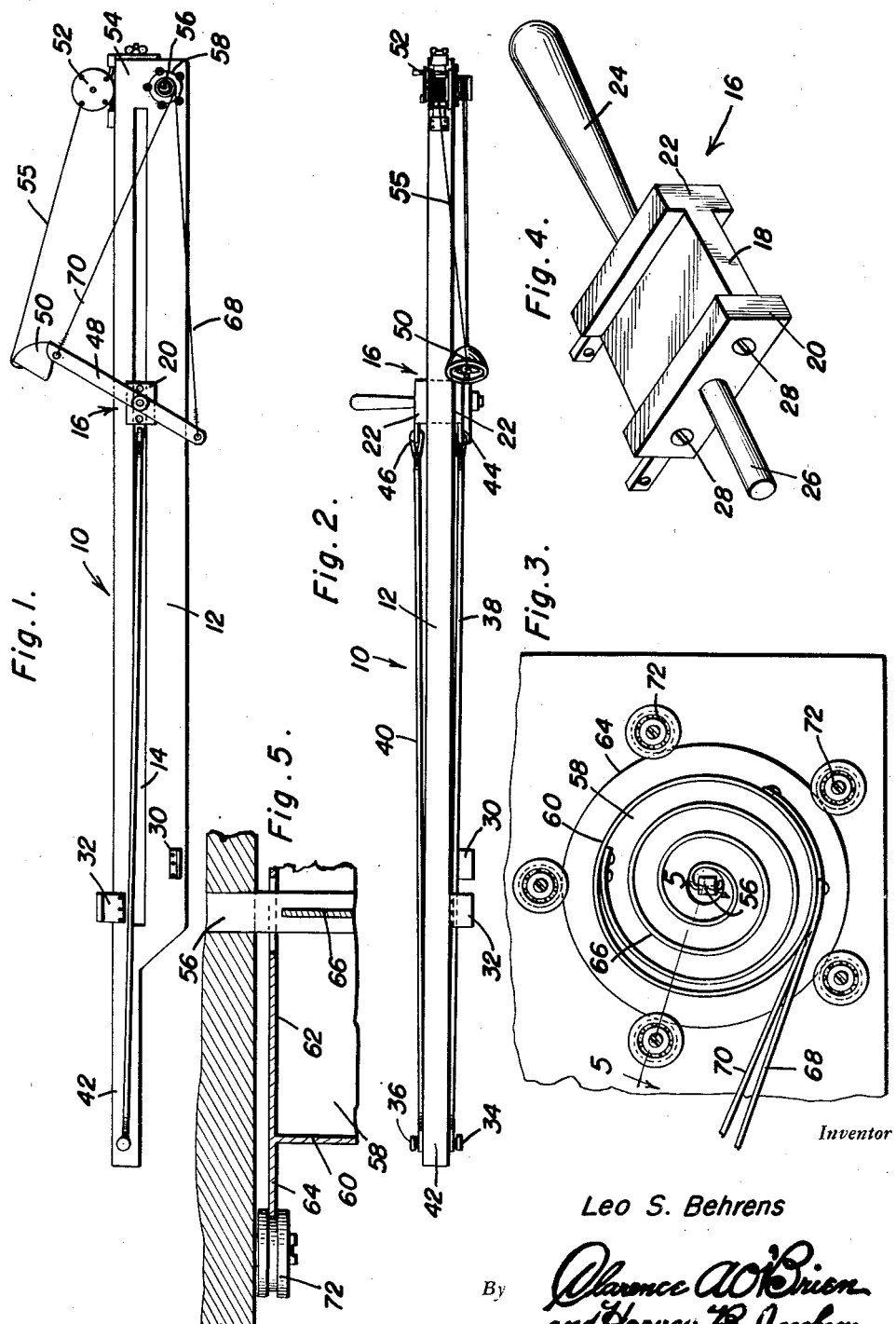

2,529,901

UNITED STATES PATENT OFFICE 2,529,901

BAIT CASTING DEVICE

Leo S. Behrens, Baton Rouge, La.

Application August 18, 1949, Serial No. 110,963

6 Claims. (Cl. 124—17)

This invention relates to catapults, and more particularly to a catapult used as a bait casting device.

An object of this invention is to provide a bait casting device which will allow convalescents, older men or inexperienced fishermen to easily and satisfactorily cast bait or a lure onto the surface of a body of water somewhat remote from the location of the device.

Other additional objects will become apparent as the following description proceeds, and are attained by this bait casting device, a preferred embodiment of which has been illustrated in the accompanying drawings, wherein:

Figure 1 is a side elevational view of the preferred embodiment of the invention;

Figure 2 is a top plan view of the bait casting device;

Figure 3 is an enlarged view of a portion of the device as shown in Figure 1, in order to illustrate in greater detail certain elements of the invention;

Figure 4 is an enlarged perspective view of the handle block of the present invention;

Figure 5 is an enlarged sectional view as taken on line 5—5, in Figure 3.

With continued reference to the drawing in which like numerals designate similar parts throughout the various views, reference numeral 10 is used to designate the bait casing device comprising the present invention. This device comprises a base member 12 having a transversely extending longitudinal slot 14 therein. Slidably positioned within slot 14 is an H-shaped sliding block generally designated by reference numeral 16. The block 16 comprises a crossbar 18 suitably joining two legs 20 and 22. A handle 24 extends perpendicularly from the block 16 and is secured to the leg 22. Secured to leg 20 is a pivot pin 26. The block 16 is made in sections, the leg 20 being secured to the crossbar 18 by means of screws 28 or the like.

Secured to the base 12 adjacent the outermost end of the slot 14 are lower and upper stop members 30 and 32. The lower stop 30 is positioned inwardly of the upper stop member 32. By means of pins 34 and 36 a pair of elastic members 38 and 40 are connected at one end thereof to the outermost end 42 of the base 12. The other ends of the elastic members 38 and 40 are secured to wires 44 and 46 which are attached to the block 16.

Pivotally connected to the block 16 upon pin 26 is a lever 48. At the upper end of the lever 48 is secured a cup-shaped receptacle 50. A conventional fishing reel 52 is secured to the upper surface of the inner end 54 of the base 12. The cup 50 is adapted to hold the bait or lure attached to the fishing line 55.

Rigidly mounted below said reel 52 is a rod 56. Coaxially placed about the rod 56 is a drum 58 having cylindrical side walls 60 and inner end walls 62. An annular flange 64 comprising an extension of the inner wall 62 is provided. A spring 66 is terminally secured to the rod 56 and the side walls 60 of the drum 58. Secured to each end of the lever 48 are a pair of wires or lines 68 and 70. The other ends of the lines 68 and 70 are secured to the outer surface of the cylindrical side wall 60, the line 68, secured to the lower end of the lever being secured in a location on the cylindrical wall 60 somewhat spaced counter-clockwise from the connection of the line 70. A plurality of annularly spaced ball bearings are mounted on the base 12 and adapted to engageably support the flange 64.

The operation of the device is as follows: The handle 24 and hence the block 16 are pulled back against the action of the elastic members 38 and 40 to stretch them. The bait at the end of the fishing line 55 is then placed in the receptacle 50. When the handle is released the block is pulled forward by the snap action of the elastic cords 38 and 40. The lever 48 contacts the lower stop member 30 which rotates the cup 50 in a counter-clockwise direction. The head 50 is then stopped by the upper stop rod 32 in an abrupt manner which catapults the bait outwardly thereof. The drum 58 in conjunction with lines 68 and 70 are used to stop the lever 48 from rotating back and forth after the cast. When the lines 68 and 70 are pulled forward they are unwound from around the outer surface of the cylindrical wall 60 of the drum, and the spring 66 is tightened by the subsequent rotation of the drum. When the handle and thence the block is pulled toward the end 54 of the base, the spring causes the drum to rotate in the other direction and rolls the lines upon the cup. By adjusting the lines to the proper length, line 68 assists stop 30 in causing the lower end of the lever arm 48 to rotate in a counter-clockwise direction because after unrolling completely it will necessarily start winding in the other direction. Additionally when the line 70 is completely unwound the lever arm will stop oscillating. It is to be understood that the tension on the lines 68 and 70 is substantially less than on elastic members 38 and 40 when the block is in position adjacent the stop members 30 and 32.

Since from the foregoing, the construction and advantages of this bait casting device may be readily understood, further explanation is believed to be unnecessary.

However since numerous modifications will readily occur to those skilled in the art after a consideration of the foregoing specification and accompanying drawings, it is not intended to limit the invention to the exact construction of the catapulting device shown and described, but all suitable modifications and equivalents may be resorted to which fall within the scope of the appended claims.

Having described the invention, what is claimed as new is:

1. A casting device comprising a base member having a longitudinal slot therein, a block slidably mounted in said base and guided by said slot, resilient means urging said block toward one end of said base, means for retaining the block at the other end of said base, and catapult means attached to said block, said catapult means comprising a lever pivotally connected medially thereof to said block.

2. A casting device comprising a base member having a longitudinal slot therein, a block slidably mounted in said base and guided by said slot, resilient means urging said block toward one end of said base, means for retaining the block at the other end of said base, catapult means attached to said block, said catapult means comprising a lever pivotally connected medially thereof to said block, and a receptacle secured to one end of said lever.

3. A casting device comprising a base member having a longitudinal slot therein, a block slidably mounted in said base and guided by said slot, resilient means urging said block toward one end of said base, means for retaining the block at the other end of said base, catapult means attached to said block, said catapult means comprising a lever pivotally connected medially thereof to said block, a receptacle secured to one end of said lever, a drum rotatably mounted on said base, and means connecting each end of said lever with said drum.

4. A casting device comprising a base member having a longitudinal slot therein, a block slidably mounted in said base and guided by said slot, resilient means urging said block toward one end of said base, means for retaining the block at the other end of said base, catapult means attached to said block, said catapult means comprising a lever pivotally connected medially thereof to said block, a receptacle secured to one end of said lever, a drum rotatably mounted on said base, means connecting each end of said lever with said drum, and bearing elements annularly positioned about said drum and in bearing engagement with said drum.

5. A casting device comprising a base member having a longitudinal slot therein, a block slidably mounted in said base and guided by said slot, resilient means urging said block toward one end of said base, means for retaining the block at the other end of said base, catapult means attached to said block, stop means on said base, said stop means comprising an upper and a lower projection, said lower projection being displaced from said upper projection in the direction of said other end.

6. A casting device comprising a base member having a longitudinal slot therein, a block slidably mounted in said base and guided by said slot, resilient means urging said block toward one end of said base, means for retaining the block at the other end thereof, a lever pivotally connected medially thereof to said block, a receptacle secured to one end of said lever, a drum mounted on said base, means connecting each end of said lever with said drum, resilient winding means within and attached to said drum, bearing elements annularly positioned about said drum and in bearing engagement therewith, stop means on said base comprising an upper and a lower projection, said lower projection being displaced from said upper projection in the direction of said other end, a reel secured to said other end of said base, means secured to said reel positioned within said receptacle, whereby upon release of means for retaining the block the means secured to said reel will be catapulted away from said casting device.

LEO S. BEHRENS.

REFERENCES CITED

The following references are of record in the file of this patent:

UNITED STATES PATENTS

| Number | Name | Date |
| --- | --- | --- |
| 2,099,957 | Graham | Nov. 23, 1937 |